United States Patent
McGrew

(12)
(10) Patent No.: US 6,717,939 B1
(45) Date of Patent: Apr. 6, 2004

(54) VIRTUAL TRANSPORT SERVER IN A TELECOMMUNICATION NETWORK

(75) Inventor: Michael Arthur McGrew, Columbus, OH (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/351,774

(22) Filed: Jul. 12, 1999

(51) Int. Cl.[7] .............................................. H04J 12/56
(52) U.S. Cl. ...................................... 370/352; 330/354
(58) Field of Search ................................ 370/351, 352, 370/353, 354, 355, 356

(56) References Cited

U.S. PATENT DOCUMENTS

| | | | | |
|---|---|---|---|---|
| 5,546,450 A | * | 8/1996 | Suthard et al. ........... | 379/15.04 |
| 5,751,706 A | * | 5/1998 | Land et al. ................. | 370/352 |
| 5,793,771 A | * | 8/1998 | Darland et al. ............. | 370/467 |
| 5,867,571 A | * | 2/1999 | Borchering ................. | 379/230 |
| 6,137,800 A | * | 10/2000 | Wiley et al. .............. | 370/395.51 |
| 6,426,942 B1 | * | 7/2002 | Sienel et al. ................ | 370/235 |
| 6,442,169 B1 | * | 8/2002 | Lewis ......................... | 370/401 |

FOREIGN PATENT DOCUMENTS

| | | |
|---|---|---|
| EP | 0792076 A2 | 8/1997 |

OTHER PUBLICATIONS

Hermann J. Helgert, Integrated Services Digital Networks:architectures, protocols, standards, 1991, Addison–Wesley, pp. 310–313.*

* cited by examiner

Primary Examiner—Wellington Chin
Assistant Examiner—William Schultz

(57) ABSTRACT

A virtual transport server apparatus in a telecommunication network having a packet network and a circuit network with a telephonic switching device, a circuit signaling interface for terminating a signaling link between the virtual transport server apparatus and the telephonic switching device coupled to the circuit network and a packet signaling interface for terminating a packet link between the virtual transport server apparatus and the packet network. A circuit receiver is coupled to a processor and the circuit signaling interface for receiving call origination information having a circuit identification code from the telephonic switching device at the circuit receiver and a packet transmitter coupled to the processor and the packet signaling interface for transmitting the call origination information from the virtual transport server apparatus to a packet circuit gateway in response to the processor processing the call origination information from the circuit receiver. Additionally, a packet receiver is coupled to the processor and the packet signaling interface for receiving virtual circuit information and in response to the processor processing the received virtual circuit information transmitting from the packet transmitter to another virtual transport server apparatus the call origination information and the virtual circuit information.

24 Claims, 5 Drawing Sheets

100

300

400

VIRTUAL TRANSPORT SERVER IN A TELECOMMUNICATION NETWORK

BACKGROUND OF THE INVENTION

This invention relates to telecommunication networks which contain circuit and packet switch network elements, and more particularly to networks which route circuit based messages through a packet network.

Telecommunication networks are commonly classified as either packet based networks or circuit based networks. A packet based network, such as an asynchronous transfer mode (ATM) network, sends data in packets through the network to remote locations. The data to be sent is subdivided into individual packets of data with each packet having a unique identification (ID) and carrying its own destination address. In this way, packets can go by different routes and arrive in a different order than transmitted. The packet ID allows the data to be reassembled in the proper sequence at the receiving device.

A circuit based network provides communication in which a fixed bandwidth circuit is established from point to point through the circuit based network and dedicated for the duration of a telephone call. An example of a circuit based network is a public switch telephone network (PSTN) using Signaling System No. 7 (SS7). Signaling System No. 7 protocol has been mandated for out-of-band signaling communication involving telecommunication network elements and has been implemented worldwide. SS7 network elements are each uniquely identified by a Message Transfer Part (MTP) Signaling Point Code (PC). Network administrators set up routes through a SS7 network so that the network elements 25 can send Message Signal Units (MSUs) from any network element to an other network element in the telecommunication network. The messages in a SS7 circuit based network are routed out-of-band and used by network elements to assign and connect fixed bandwidth circuits called bearer channels for the duration of the telephone call.

A gateway is a network device that bridges or connects two incompatible networks together. A packet circuit gateway is a network device that connects a packet network and circuit network. The packet circuit gateway allows fixed bandwidth circuits of the circuit network to be connected with the virtual circuits of the packet network for seamless transfer of voice and data information across both networks.

Quality of service problems occur when transporting voice and data information from high availability telephonic circuit based network through a packet network to another high availability circuit based network. It is critical that the customers of a service provider have the ability to communicate through the telecommunication network. Moreover, there are federal (United States) and world (International Telecommunications Union -Telecommunications (ITU-T)) reporting requirements for SS7 failures ("outages") above a certain threshold. Therefore, if the packet network is between two SS7 circuit based networks, the packet based network and gateway devices are required to meet the same availability standards as the SS7 networks. However, gateway devices are typically not designed, like PSTN telephonic switches, for high availability.

In order to achieve the quality of service level of a SS7 network, additional redundancy and fault tolerance features must be designed into the gateway devices. This approach of redesigning gateway devices is undesirable because of the increased complexity required in the gateway devices and additional cost to the telecommunication service provider. Therefore, there is a need in the art to prevent disruption of telecommunication service while utilizing the gateway devices with a minimal increase in complexity to route telephone calls in a telecommunication network containing both circuit based networks and packet based networks.

SUMMARY OF THE INVENTION

The problems noted above are solved in accordance with the invention and a technical advance is achieved in the art, by using a virtual transport server (VTS) to work in conjunction with a packet circuit gateway to setup virtual connections for a circuit through the packet network. The VTS network entity has connections to both the telephonic switches in a circuit network and the packet network. The packet circuit gateway also has connections to both the circuit network and the packet network. Additionally, the VTS communicates with the packet circuit gateway via the packet network.

The VTS receives call setup messages from telephonic switches in the circuit network. The VTS processes the call setup messages and notifies another VTS at another side of the packet network that a call is being setup. Each VTS notifies the packet circuit gateway connecting the respective circuit network and packet network. In response to the VTSs notifications, the packet circuit gateways set up a virtual connection through the packet network and signal the circuit IDs to the VTS. The VTSs transmit the circuit IDs, over the circuit networks, to the telephonic switches. The telephonic switches use the circuit IDs to make a connection to the packet circuit gateways and the virtual circuit through the packet network. Thus, a connection is placed through both circuit networks and the packet network.

BRIEF DESCRIPTION OF THE DRAWINGS

The foregoing objects and advantageous features of the invention will be explained in greater detail and others will be made apparent from the detailed description of the preferred embodiment of the present invention which is given with reference to the several figures of the drawing, in which.

DETAILED DESCRIPTION

Figure 1:
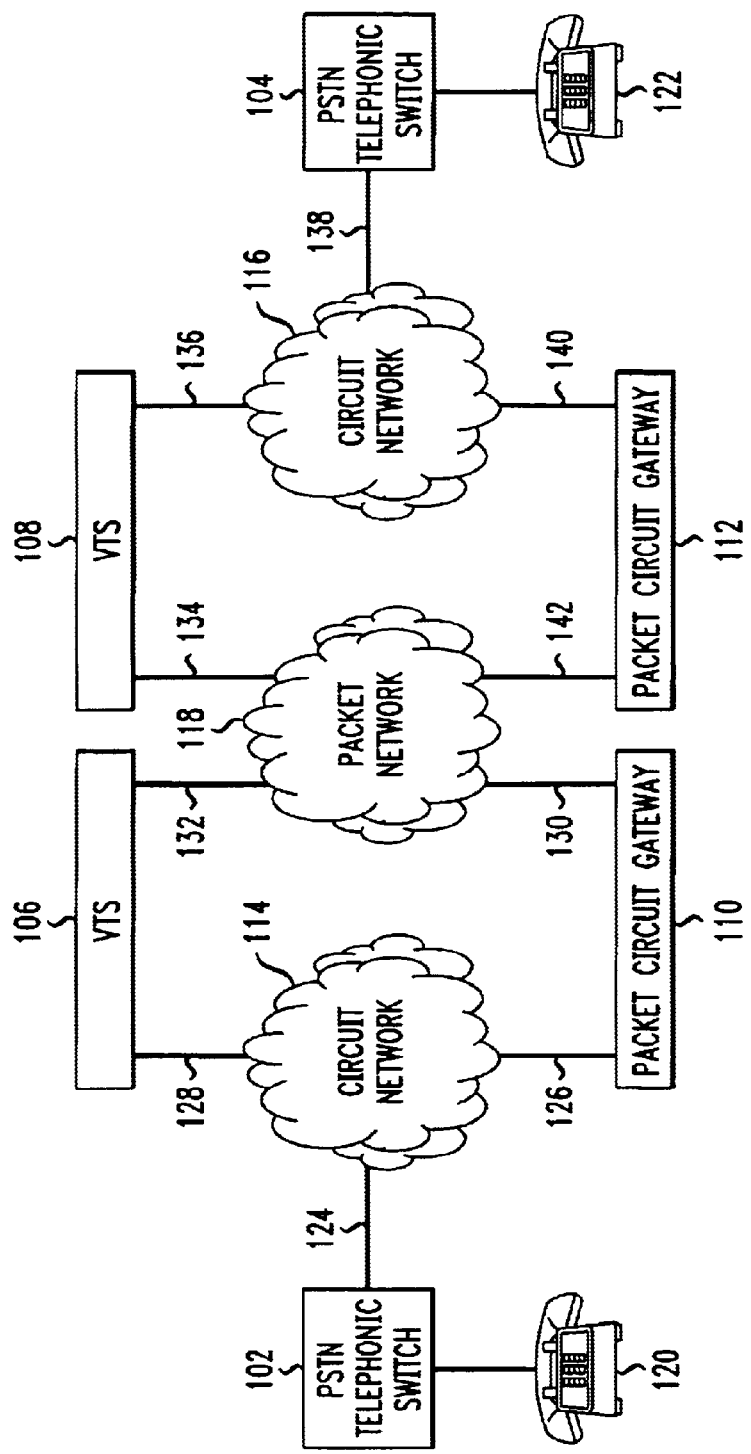
FIG. 1 is a block diagram of a telecommunication network having two SS7 PSTN telephonic switches, each connected to a virtual transport server and packet circuit gateway communicating across a circuit based and packet based network in accordance with an embodiment of the invention.

FIG. 1 is a block diagram illustrating a telecommunication network 100 having two SS7 public switched telephone network (PSTN) telephonic switches 102, 104, each coupled to a virtual transport server 106,108 and a packet circuit gateway 110, 112 communicating across SS7 circuit based networks 114, 116 and an ATM packet based network 118 in accordance with an embodiment of the invention. The PSTN telephonic switch 102 is coupled to a telephonic device 120 and to the SS7 circuit network 114 by a circuit signaling link 124. The SS7 circuit network 114 is connected to the packet circuit gateway 110 by a circuit link 126. Similarly, the virtual transport server (VTS) 106 is connected to the circuit network 114 by a circuit signaling link 128. The packet circuit gateway 110 also has a connection to the ATM packet network 118 by a packet link 130. The VTS 106 is similarly connected to the ATM packet network 118 by a packet link 132. Another VTS 108 is connected to the ATM packet network 118 by packet link 134 and another SS7 circuit network 116 by circuit signaling link 136. The other SS7 circuit network 116 is coupled to the other PSTN telephonic switch 104 by a circuit signaling link 138, another packet circuit gateway 112 by circuit link 140, and the other VTS 108 by circuit signaling link 136. The other packet circuit gateway 112 is also connected to the ATM packet network 118 by packet link 142. The other PSTN telephonic switch 104 is also coupled to another telephonic device 122.

In accordance with the present invention a call set up is divided into a call origination portion and a call termination portion. The call origination portion is defined in the present embodiment as the PSTN telephonic switch 102 originating the call and having a partial call path through the SS7 circuit network 114 and a virtual circuit identified through the ATM packet network 118. The call termination portion is the call path set up from the ATM packet network 118 to the PSTN telephonic switch 104 terminating the telephone call.

The call origination starts when the telephonic device 120 originates a call at the PSTN telephonic switch (telephonic switching device) 102 in a SS7 network. The PSTN telephonic switch 102 sends a call origination message over the circuit signaling link 124 to the virtual transport server (VTS) 106 via the circuit network 114 and the circuit signaling link 128. The call origination message contains information such as the telephonic identification of the called party, telephonic identification of the calling party, and circuit identification code. An example of a call origination message is an Initial Address Message (IAM) as defined in the Integrated Services Digital Network User Part (ISUP) ITU-T recommendations Q.761 and Q.764.

A signaling link between devices in a SS7 circuit network are identified by three parameters, two point codes (PCs) at each end of the link and a signaling link code (SLC). Similarly, a bearer channel is defined by two PCs and a circuit identification code (CIC). The bearer channel is the actual link that carries the voice or data communication through the telecommunication network 100. Therefore, the PSTN telephonic switch 102 has identified a bearer channel to the packet circuit gateway 110 and sent this information to the VTS 106.

The VTS 106 receives the call setup message from the PSTN telephonic switch 102 and process the data contained in the message. The VTS 106 extracts the CIC for the bearer channel from the received call setup message and determines which packet circuit gateway will switch the call to the ATM packet network 118. The determination is made by processing the call origination information and identifying the area of the telecommunication network 100 the call will be terminated. The VTS 106 then sends the call origination information along with the circuit identification code in a message to the selected packet circuit gateway 110. The message is sent from the VTS 106 over the packet link 132 through the ATM packet network 118.

Each packet sent from a packet device, such as the VTS 106, may be routed over different paths through the ATM packet network 118. Each packet contains routing information identifying a sequence number, an originating device code, a terminating device code, and a virtual circuit identification code. The originating and terminating device codes aid in routing packets to receiving devices. The virtual circuit identification is used by the gateways to allow the packet network to appear as a circuit based network and interact with the SS7 circuit networks. Additionally, the sequence number allows the packets to be reassembled in the proper order at the receiving device.

The packet circuit gateway 110 receives the call origination information and the circuit identification code over the packet link 130 via the ATM packet network 118 from the VTS 106. The packet circuit gateway 110 connects the bearer channel associated with the circuit identification code to a virtual circuit. The virtual circuit identification information is then transmitted from the packet circuit gateway 110 to the VTS 106 via the ATM packet network 118.

Upon finishing the call origination setup, the VTS 106 formats a message containing the call origination information and virtual circuit identification information and conveys the message to the other VTS 108 across the packet network 118. The other VTS 108 receives the message over the packet link 134 from the packet network 118 and proceeds with call termination set up. The other VTS 108 then determines which packet circuit gateway to select in order to route the telephone call to the terminating PSTN telephonic switch 104 and the terminating telephonic device 122. In the present example, the other VTS 108 determines that the call us to be routed through the other packet circuit gateway 112 and sends the virtual circuit connection information to the other packet circuit gateway in a message over the ATM packet network 118.

The other packet circuit gateway 112 is connected to the packet network 118 by packet link 142 and receives the message from the other VTS 108 containing the virtual circuit identification information. The other packet circuit gateway 112 uses the virtual circuit routing information to set up a virtual route through the packet network 118. The route through the packet network is a virtual route defined by the virtual circuit identification code and addresses of the two packet gateways. Additionally, the other packet circuit gateway 112 selects a bearer channel having another circuit identification code and associates it with the virtual circuit identification code. The other packet circuit gateway 112 then transmits the other circuit identification code of the selected bearer channel to the VTS 108 via the ATM packet network 118. In an alternate embodiment, the VTS 106 does not know of the PCG 122. The VTS 106 sends the packet network address of the PCG 112 that is associated with the VTS 106 to the other VTS 108. The other VTS 108 then identifies the particular PCG 112 that can be used to complete the call. After both PCGs 110 and 112 have been identified, a bearer channel (virtual circuit) maybe set up through the packet network 118.

The other circuit identification code is received at the VTS 108 and identifies the bearer channel between the other PSTN telephonic switch 104 and the other packet circuit gateway 112. The devices on each end of the channel use the same channel in order to carry voice or data traffic. The VTS 108 sends the call origination information and the other circuit identification code in a message to the other PSTN telephonic switch 104 over the SS7 circuit network 116. The other PSTN telephonic switch 104 receives the message and extracts the call set up information and sets up the final part of the telephone call to the telephonic device 122 over the selected bearer channels and virtual connection.

As shown above, the PSTN telephonic switches 102,104 are not impacted and do not require any design changes for calls to be routed through the ATM packet network 118 by VTSs 106,108. Additionally, the VTSs 106, 108 control the call processing through the ATM packet network 118 and no changes are required in the packet circuit gateways 110,112. Therefore, calls are routed from circuit based networks through a packet network with no changes to existing network elements.

Figure 2:
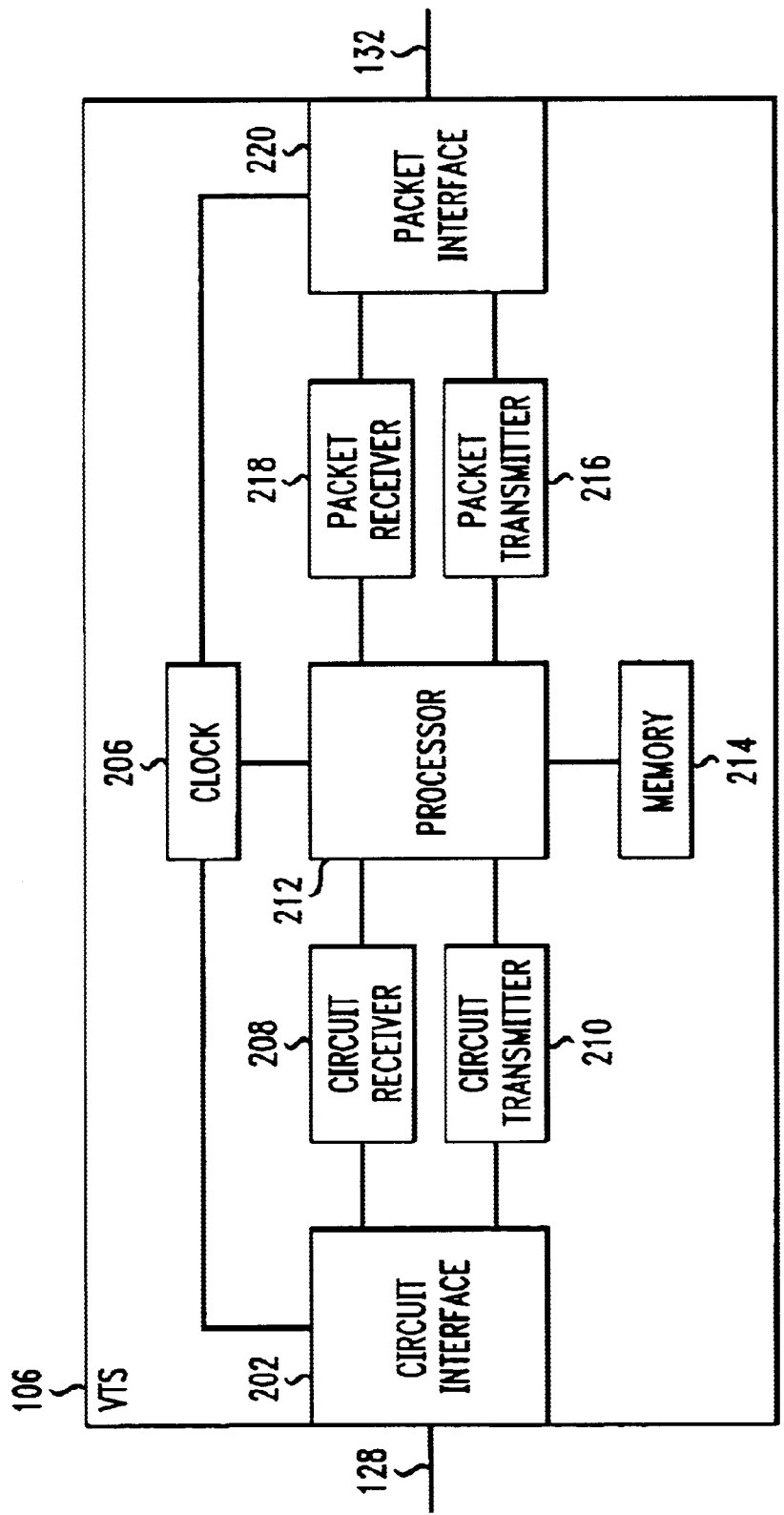
FIG. 2 is a block diagram of a virtual transport server in accordance with an embodiment of the invention.

Referring now to FIG. 2, a block diagram of a virtual transport server (VTS) 106 in accordance with an embodiment of the invention is shown. The VTS 106 has a circuit interface 202 coupled to a circuit signaling link 128, a clock 206, a circuit receiver 208, and a circuit transmitter 210. The circuit receiver 208 is coupled to a processor 212, and the circuit interface 202. The processor 212 is coupled to the circuit receiver 208, the circuit transmitter 210, the clock 206, a memory 214, a packet transmitter 216, and a packet receiver 218. The packet receiver 218 is coupled to the processor and a packet interface 220. The packet interface 220 is coupled to the packet receiver 218, the packet transmitter 216, the clock 206, and a packet link 132.

The VTS 106 receives the call setup message from the PSTN telephonic switch 102, FIG. 1, requiring a connection to the other PSTN telephonic switch 104 through the packet network 118. The call setup message is received via the circuit interface 202, FIG. 2, over the circuit signaling link 128 at the circuit receiver 208. The processor 212 processes the received message and determines that the message received is a call setup message and creates a record in the memory 214 for the call information. The call setup message contains information such as a calling party identification, a called party identification, and a circuit identification code. The circuit identification code identifies the bearer channel assigned by the PSTN telephonic switch 202 for the call.

The processor 212 then determines that packet circuit gateway 110, FIG. 1, will be used to route the telephone call and formats a message containing the circuit identification code and other routing information. The call origination message is sent from the processor 212, FIG. 2, to the packet transmitter 216. The packet transmitter 216 transmits the messages through the packet interface 220 to the packet network 118, FIG. 1, over the packet link 132, FIG. 2.

The packet gateway 110, FIG. 1, receives the call origination messages from the VTS 106, FIG. 2. The packet gateway 118, FIG. 1, processes the call origination information contained in the message and associates a virtual circuit with the circuit identification code of the bearer channel received from the VTS 106, FIG. 2. The virtual circuit is identified by a virtual circuit identification code and is sent to the VTS 106 in a virtual circuit information message via the packet network 118, FIG. 1.

The VTS 106, FIG. 2, receives the virtual circuit information message at the packet receiver 218 from the packet interface 220. The processor 212 then processes the virtual circuit information message and extracts the virtual circuit identification code. The extracted virtual circuit identification code is then stored by the processor 212 in the call record in the memory 214. The processor 212 then formats a message to another VTS 108, FIG. 1, containing the call origination information and virtual circuit routing information. The message formatted by the processor 212, FIG. 2, is transmitted by the packet transmitter 216 through the packet interface 220 into the packet network 118, FIG. 1, over the packet link 132, FIG. 2, and the call origination setup portion of the telephone call is complete.

The VTS 106 retains the call origination information until the call origination information and virtual circuit routing information messages are sent to the other VTS 108, FIG. 1. There is no need to store the call origination information at the VTS 106 for the duration of the call. It is understood that the call origination information can be selectively stored in memory 214, FIG. 2, until a call setup complete message is received at the VTS 106, a timer expires, or the happening of another event that occurs after the call origination information and the virtual circuit routing information message are sent to the other VTS 108, FIG. 1.

The VTS 106, FIG. 2, can also terminate a call set up that originated in another part of the telecommunication network 100, FIG. 1. For example, the VTS 106, FIG. 2, terminates a call set up that is originated by the PSTN telephonic switch 104, FIG. 1, and telephonic device 122. The call origination message is processed by the other VTS 108 and the call origination information and virtual circuit routing information is transmitted in a message to the VTS 106, FIG. 2, via the packet network 118, FIG. 1. The call origination information and virtual circuit routing information is received at the packet receiver 218 from the packet network 118, FIG. 1. The processor 212, FIG. 2, extracts the call origination information and virtual circuit routing information from the received message. The extracted data is stored in the memory 214 by the processor 212. The processor 212 then formats a message for the packet circuit gateway 110, FIG. 1, containing the virtual circuit routing information. The packet transmitter 216, FIG. 2 transmits the virtual circuit routing information to the packet circuit gateway 110, FIG. 1, via the packet network 118. The packet circuit gateway 112 receives the virtual circuit routing information from the VTS 106, FIG. 2. The packet circuit gateway 110, FIG. 1, associates an available bearer channel to the PSTN telephonic switch 102 with the virtual circuit and sends the circuit identification code of the bearer channel to the VTS 106, FIG. 2, via the packet network 118, FIG. 1.

The VTS 106, FIG. 2, receives at the packet receiver 218 the message containing the circuit identification code from the packet circuit gateway 110, FIG. 1.

The processor 212, FIG. 2, extracts the circuit identification code from the received message and stores the circuit identification code in the memory 214 of the VTS 106. In response to receiving the circuit identification code, the processor 212 formats a message containing the call origination information and circuit identification code for the terminating PSTN telephonic switch 102, FIG. 1. The message formatted by the processor 212, FIG. 2, is transmitted by the circuit transmitter 210 through the circuit interface 202, circuit signaling link 128, and circuit network 114, FIG. 1, to the PSTN telephonic switch 102. Upon sending the circuit identification code to the PSTN telephonic switch 102, the call origination information stored in memory 214, FIG. 2, is cleared. Thus, a call setup termination is complete and a voice or data path exists through the telecommunication network 100.

Figure 3:
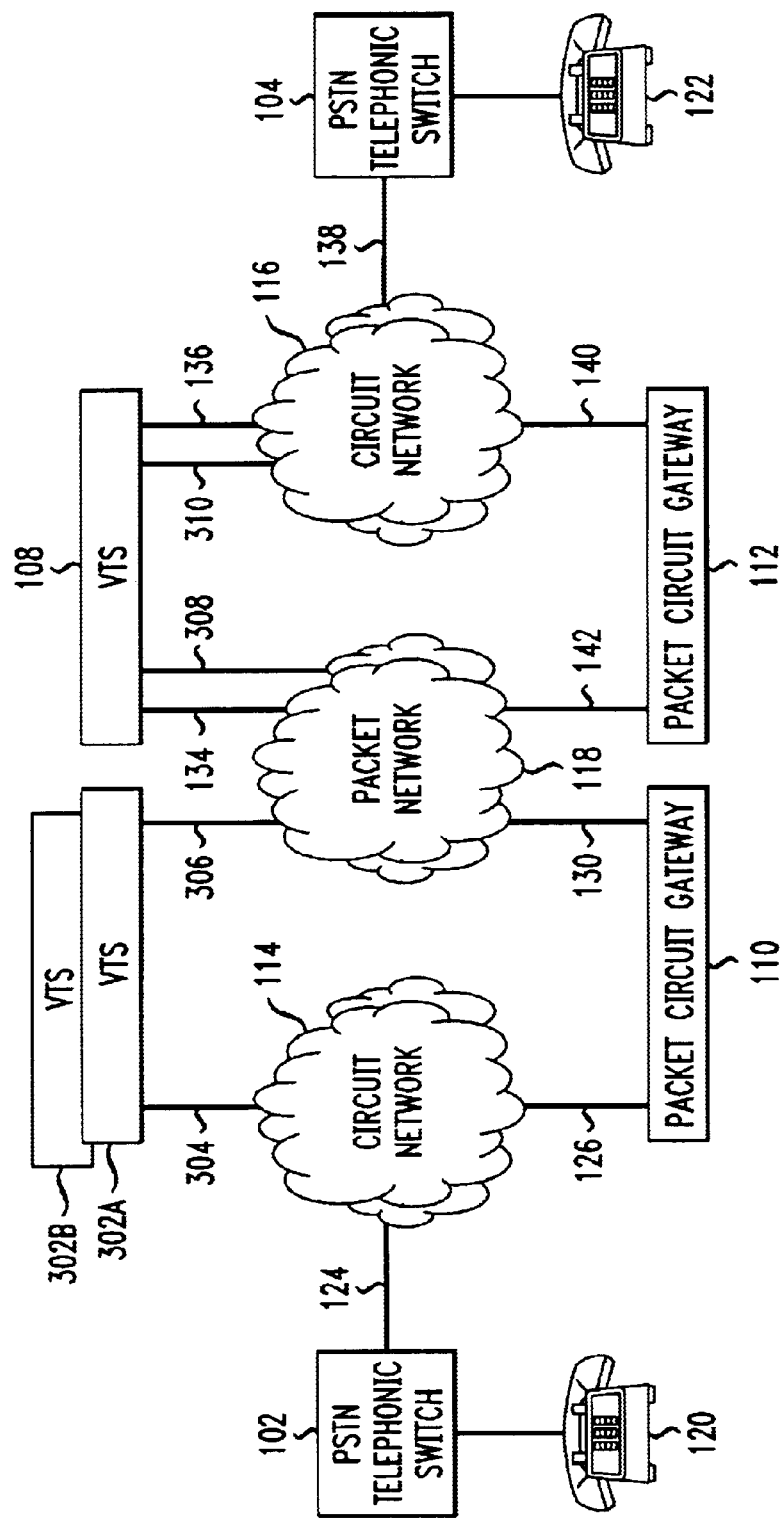
FIG. 3 is a block diagram of an alternative telecommunication network having two SS7 PSTN telephonic switches coupled via a packet network and circuit networks to a redundant VTS, a single VTS with redundant links, and packet circuit gateways in accordance with an embodiment of the invention.

In FIG. 3, a block diagram of an alternative telecommunication network 300 having two SS7 PSTN telephonic switches 102,104 coupled via a packet network 118 and circuit networks 114, 116, a redundant pair of VTSs 302A, 302B, a single VTS 108, and packet circuit gateways 110, 112 is shown. The PSTN telephonic switch 112 is coupled to a telephonic device 120 and by a circuit signaling link 124 to the circuit network 114. The circuit network 114 has additional connections to the packet circuit gateway 110 by circuit link 126 and by circuit signaling link 304 to the redundant pair of virtual transport servers 302A, 302B. The packet circuit gateway 110 is also coupled to the packet network 118 by packet link 130. Similarly, the redundant pair of VTSs are coupled to the packet network 118 by packet links 306. Another PSTN telephonic switch 104 is coupled to another circuit network 116 by circuit signaling link 138. The other circuit network 114 is connected to another packet circuit gateway 112 by circuit link 140 and another VTS 108 by redundant circuit signaling links (signaling link 136 and a redundant signaling link 310). The other VTS 108 is also coupled to the packet network by a redundant pair of packet links 134, 308 and the other packet circuit gateway is connected to the packet network by packet link 142.

The other PSTN telephonic switch 104 is coupled to another telephonic device 122 and by circuit signaling link 138 to the other circuit network 116. The other circuit network 116 is also coupled to another packet circuit gateway 112 by circuit signaling link 140 and to another VTS 108 by circuit signaling link 136. Additionally, the VTS is coupled to the packet network 118 by packet link 134 and the packet circuit gateway is coupled to the packet network 118 by packet link 142.

The telephonic device 120 originates a telephone call to the PSTN telephonic switch 102 causing a call origination message containing the call origination data to be generated. The PSTN telephonic switch 102 transmits the call origination message to the redundant pair of VTSs 302A, 302B via the circuit network 114. The redundant pair of VTS 302A, 302B receive the call origination message and processes the information contained in the message.

The redundant pair of VTSs 302A, 302B can be selectively configured to have the received message processed by an active VTS 302A with a standby VTS 302B ready to take over the processing of call information upon the failure of the active VTS 302A or both VTSs 302A, 302B can be active and "load share" (call originations and terminations processed between both VTSs 302A, 302B) the processing of received messages. Redundancy may also be achieved by using SS7 alias point codes where a VTS 302B recognizes the point codes of its mate VTS 302A. In case of SS7 link failure of the normal VTS 302A, the SS7 network alternate routing sends Message Signal Units (MSUs) with VTS 302A point codes to the redundant VTS 302B. The preferred embodiment has an active VTS 302A with a standby VTS 302B as backup. Therefore the call origination information is received and processed by the VTS 302A. If the VTS 302A is unavailable, then the VTS 302B will take over the processing of received messages.

The redundant pair of VTSs 302A, 302B (302A being active) process the call origination information and extract the circuit identification code associated with a bearer channel assigned by the PSTN telephonic switch 102. The received circuit identification code is then transmitted from the redundant pair of VTSs 302A, 302B to the packet circuit gateway 110 via the packet network 118.

The packet circuit gateway 110 receives the message sent by the redundant pair of VTSs 302A, 302B. The packet circuit gateway 110 processes the received message and extracts the circuit identification code. The packet circuit gateway 110 then associates the circuit identification code with a virtual circuit. The packet circuit gateway 110 then formats a message for the redundant pair of VTSs 302A, 302B containing the virtual circuit routing information. The message is sent from the packet circuit gateway 110 to the redundant pair of VTSs 302A, 302B via the packet network 118.

The redundant pair of VTSs 302A, 302B (302A being active) receives the message containing the virtual circuit route information. The redundant pair of VTSs 302A, 302B extract the virtual circuit route information from the received message and then format a message for the other VTS 118 containing the call origination information and the virtual circuit route information. The formatted message is sent from the redundant pair of VTSs 302A, 302B to the other VTS 108 via the packet network 118.

The call setup of the terminating portion of the call is the same as described in FIG. 1, except that VTS 108 has redundant packet links 134, 308 and redundant circuit signaling links 310,136. If one of the links should fail, the messages from the packet network or circuit network would still be able to be received at the VTS 108 over the redundant link. The example shown is only a single VTS 108, but redundant links may also be employed with a redundant pair of VTSs such as 302A, 302B.

Figure 4:
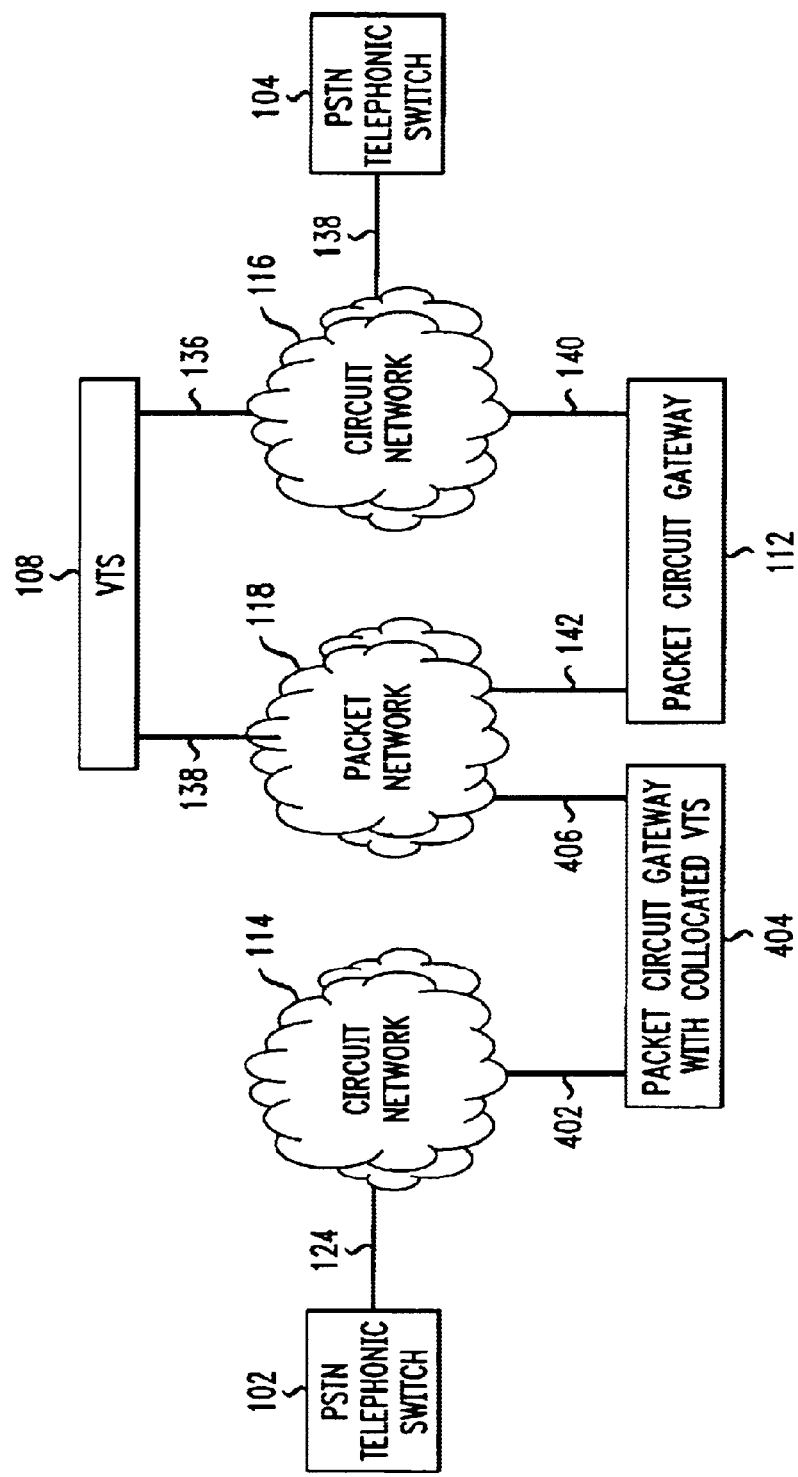
FIG. 4 is a block diagram of an alternative telecommunication network having two SS7 PSTN telephonic switches, one connected to a virtual transport server collocated with a packet circuit gateway and the other connected to virtual transport server and a packet circuit gateway.

In FIG. 4, a block diagram of an alternate telecommunication network 400 is shown having a PSTN telephonic switch 102 coupled to a collocated virtual transport server/packet circuit gateway 404 and another PSTN telephonic switch 104 connected to another virtual transport server 108 and a packet circuit gateway 112. The collocated VTS 404 involves separate devices that are physically located together and share selected resources such as cabinets, power supplies, and fuse panels. Even through the packet circuit gateway and VTS devices reside together, the signaling passes over a backplane or cables as if the devices resided separately in a network. The advantage to collocating is the reduction in space required for the separate devices and cost savings associated with fewer power supplies, cabinets, and less floor space.

The PSTN telephonic switch 102 sends a call setup message to the collocated VTS 404 via the circuit network 114. The call setup message contains a circuit identification code for a bearer channel between the PSTN telephonic switch 102 and the collocated VTS/packet circuit gateway 404. The collocated VTS/packet circuit gateway 404 formats and routes a call origination information message internally from the VTS portion of the collocated device 404 to the packet gateway portion of the collocated device 404. The packet gateway portion of the collocated device 404 associates a virtual circuit with the received circuit identification code of the bearer channel. The VTS portion of the collocated device 404 then receives the virtual circuit route information from the packet circuit gateway portion. The collocated VTS/packet circuit gateway 404 then sends a message containing the call origination information and virtual circuit route identification to the other VTS 108 via the packet network 118. The call setup origination is complete at this point and the call setup termination (routing call from the packet network to the PSTN telephonic switch 104) is similar to the call setup termination described in FIG. 1.

Figure 5:
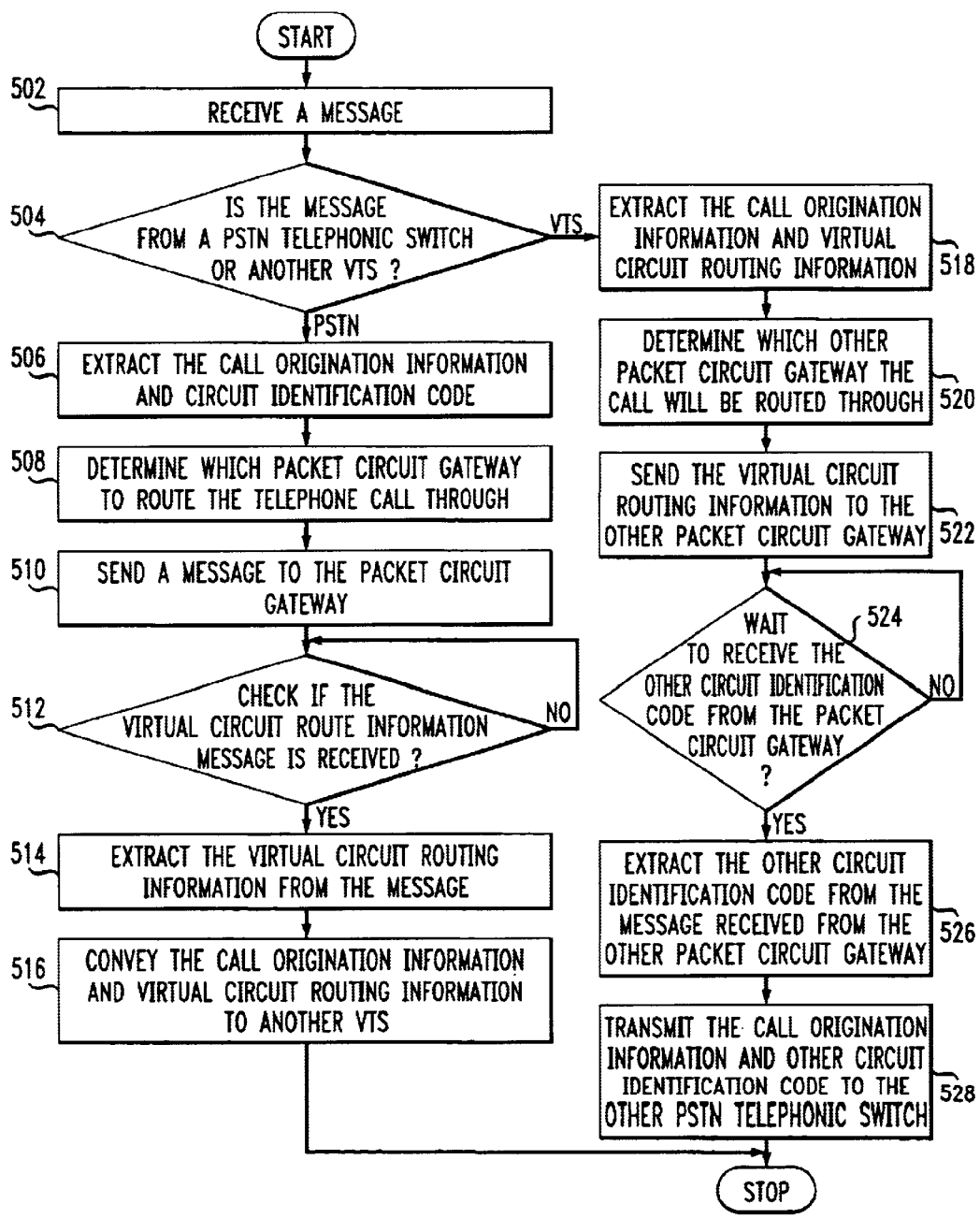
FIG. 5 a flow chart diagram illustrating the steps of the invention performed at a virtual transport server to setup the origination or termination portions of a call from a telephonic device to another telephonic device across a packet network.

FIG. 5 is a flow chart diagram illustrating the steps of the invention performed at a virtual transport server (VTS) to setup the origination portion or termination portion of a call from a telephonic device to another telephonic device across a packet network.

A telephonic device 120, FIG. 1, originates a call transmitted through a PSTN telephonic switch 102. The PSTN telephonic switch 102 formats a call origination message containing call origination information and a circuit identification code. The call origination message is sent from the PSTN telephonic switch 102 to a process running on VTS 106. In step 502, FIG. 5, the process running on VTS 106 receives the message from the PSTN telephonic switch 102 and determines if the message is identified as from a PSTN telephonic switch or another VTS 108 in step 504, FIG. 5. If the received message is a call origination message from a PSTN telephonic switch then in step 506, FIG. 5, the process running on VTS 106, FIG. 1, extracts the call origination information and circuit identification code from the received message in step 508, FIG. 5, determining which packet circuit gateway to route the telephone call through is performed. The process running on VTS 106, FIG. 1, is able to determine which packet circuit gateway to route the call through by processing the call origination information from the PSTN telephonic switch 102. In the present example, the packet circuit gateway 110 is chosen by the process running on VTS 106. The process running on VTS 106 then formats a message containing the circuit identification code for the packet circuit gateway 110 and sends the message to the packet circuit gateway in step 510, FIG. 5. The packet circuit gateway 110, FIG. 1, receives the message and responds by sending a virtual circuit routing information message.

In step 512, FIG. 5, the process running on VTS 106, FIG. 1, checks if the virtual circuit routing information message is received from the packet circuit gateway 110. If the message is not received by the process running on VTS 106, then the process continues to wait, otherwise the virtual circuit routing information is extracted from the received message in step 514, FIG. 5. In step 516, the process running on VTS 106, FIG. 1, formats the call origination information and the virtual circuit routing information into a message for the other VTS and conveys the message across the network.

The process running on the other VTS 108 receives the message in step 502, FIG. 5. The process then determines if the message is from the PSTN telephonic switch or another VTS, step 504. The current message was sent by a process running on VTS 106 and received at the process running on the other VTS 108, therefore the message was not from a PSTN telephonic switch. In step 518, FIG. 5, the call origination information and virtual circuit routing information is extracted from the received message.

The process running on the other VTS 108, FIG. 1, next determines which other packet circuit gateway to route the telephone call through, step 520, FIG. 5. The call origination information is used by the process running on the other VTS 108, FIG. 1, to route the telephone call through packet circuit gateway 112. The process running on the other VTS 108 formats a message containing the virtual route information and sends it to the packet circuit gateway 112, step 522, FIG. 5.

In step 524, the process running on the other VTS 108, FIG. 1, waits to receive the other circuit identification code message from the other packet circuit gateway 112. If the message is not received the process on the other VTS 108 continues to wait. If the message containing the other circuit identification code is received by the process running on the other VTS 108, then the other circuit identification code is extracted from the received message in step 526, FIG. 5. The process on the other VTS 108, FIG. 1, formats a message to the other PSTN telephonic switch 104 containing the call origination information and the circuit identification code in step 528, FIG. 5, and completes the call termination setup.

While the specification in this invention is described in relation to certain implementations or embodiments, many details are set forth for the purpose of illustration. Thus, the foregoing merely illustrates the principles of the invention. For example, this invention may have other specific forms without departing from its spirit or essential characteristics. The described arrangements are illustrative and not restrictive. To those skilled in the art, the invention is susceptible to additional implementations or embodiments and certain of the details described in this application can be varied considerably without departing from the basic principles of the invention. It will thus be appreciated that those skilled in the art will be able to devise various arrangements which, although not explicitly described or shown herein, embody the principles of the invention are thus within its spirit and scope.

Although an explanation of embodiments of the present invention have been made above with reference to the specification and drawings, the scope of the invention is defined by the claims which follow.

What is claimed is:

1. A method of call setup in a telecommunication network having a packet network and a circuit network comprising the steps of:
   transmitting call origination information from a virtual transport server to a packet circuit gateway in response to the virtual transport server receiving a circuit identification code from a telephonic switching device coupled to the circuit network;
   wherein the virtual transport server includes a redundant virtual transport server;
   conveying the call origination information and the virtual circuit routing information to another virtual transport server from the virtual transport server in response to the virtual transport server receiving the virtual circuit routing information from the packet circuit gateway;
   receiving another circuit identification code at the other virtual transport server from another packet circuit gateway in response to the other virtual transport server transmitting the virtual circuit routing information to the other packet circuit gateway;
   sending the call origination information and the other circuit identification code from the other virtual transport server to another telephonic switching device;
   sharing the processing of call setup between the virtual transport server and the redundant virtual transport server; and
   aliasing a point code assigned to the virtual transport server at the redundant transport server.

2. The method of call setup of claim 1 including the step of coupling the virtual transport server to the circuit network with redundant circuit signaling links.

3. The method of call setup of claim 2 in which the redundant circuit signaling links are associated common-channel signal links.

4. The method of claim 1 including the step of connecting the virtual transport server to the packet network with a redundant pair of packet links.

5. The method of claim 1 including the step of collocating the virtual transport server with the packet circuit gateway.

6. The method of claim 1, wherein the step of aliasing the point code assigned to the virtual transport server at the redundant transport server comprises the step of:
   aliasing the point code assigned to the virtual transport server at the redundant transport server to allow the virtual transport serve to receive messages when the virtual transport server is unavailable.

7. A method for call origination in a telecommunication network having a packet network and a circuit network with a telephonic switching device comprising the steps of:

receiving at a processor call origination information having a circuit identification code transmitted from the telephonic switching device coupled to the circuit network;

sending the call origination information to a packet circuit gateway via the packet network;

transmitting the call origination information and virtual circuit information from the processor to a virtual transport server in response to the processor receiving the virtual circuit information from the packet circuit gateway;

sharing the processing of the call origination information between the processor and a redundant processor coupled with the processor; and aliasing a point code associated with the processor at the redundant processor.

8. The method of claim 7 including the step of coupling the processor to the circuit network by a redundant pair of associated common channel signaling links.

9. The method of claim 7 including the step of connecting the processor to the packet network with a redundant pair of a packet links.

10. The method of claim 7 including the step of collocating the processor with the packet circuit gateway.

11. The method of claim 7, wherein the step of aliasing the point code associated with the processor at the redundant processor comprises the step of:

aliasing the point code associated with the processor at the redundant processor to allow the redundant processor to receive messages sent to the processor when the processor is unavailable.

12. A method for call termination in a telecommunication network having a packet network and a circuit network with a telephonic switching device comprising the steps of:

receiving at a processor call origination information and virtual circuit routing information from a virtual transport server;

sending the virtual circuit routing information to a packet circuit gateway for assignment of a circuit identification code;

transmitting from the processor the call origination information and the circuit identification code to the telephonic switching device in response to the processor receiving the circuit identification code form the packet circuit gateway; and aliasing a point code associated with the processor on the redundant processor in order for the redundant processor to receive messages sent to the processor when the processor is unavailable.

13. The method of claim 12 including the step of coupling the processor to the circuit network by a redundant pair of associated common channel signaling links.

14. The method of claim 12 including the step of sharing between the processor and the redundant processor the processing of the call origination information.

15. The method of claim 12 including the step of connecting the processor to the packet network with a redundant pair of packet links.

16. The method of claim 12 including the step of collocating the processor with the packer circuit gateway.

17. A virtual transport server apparatus in a telecommunication network having a packet network and a circuit network with a telephonic switching device:

a circuit signaling interface for terminating a signaling link between the virtual transport server apparatus and the telephonic switching device coupled to the circuit network;

a packet signaling interface for terminating a packet link between the virtual transport server apparatus and the packet network;

a circuit receiver coupled to a processor and the circuit signaling interface for receiving call origination information having a circuit identification code from the telephonic switching device at the circuit receiver;

a packet transmitter coupled to the processor and the packet signaling interface for transmitting the call origination information from the virtual transport server apparatus to a packet circuit gateway in response to the processor processing the call origination information from the circuit receiver;

a packet receiver coupled to the processor and the packet signaling interface for receiving virtual circuit information and in response to the processor processing the received virtual circuit information transmitting from the packet transmitter to another virtual transport server apparatus the call origination information and the virtual circuit information; and a redundant virtual transport server apparatus coupled to the virtual transport server apparatus wherein the redundant virtual transport server apparatus has an alias point code associated with the virtual transport server apparatus.

18. The virtual transport server apparatus of claim 17 including a redundant signaling link coupled to the circuit interface and the telephonic switching device.

19. The virtual transport server apparatus of claim 17 in which the redundant virtual transport server apparatus and the virtual transport server apparatus divide processing of the call origination information.

20. The virtual transport server apparatus of claim 17 including a redundant packet link coupled to the packet signaling interface and the packet network.

21. The apparatus of claim 17, wherein the redundant virtual transport server apparatus has the alias point code associated with the virtual transport server apparatus for receiving messages routed to the virtual transport server apparatus when the virtual transport server apparatus is unavailable.

22. A virtual transport server apparatus in a telecommunication network having a connection to a circuit network having a telephonic switching device and a packet network comprising:

a circuit signaling interface for terminating a signaling link between the virtual transport server apparatus and the telephonic switching device coupled to the circuit network;

a packet signaling interface for terminating a packet link between the virtual transport server apparatus and the packet network;

a packet receiver coupled to a processor and the packet signaling interface for receiving call origination information and virtual circuit routing information from another virtual transport server apparatus via the packet network;

a packet transmitter coupled to the processor and the packet signaling interface for transmitting the virtual circuit routing information from the virtual transport server apparatus to a packet circuit gateway in response to the processor processing the call origination information and the virtual circuit routing information received by the packet receiver;

a circuit transmitter coupled to the processor and the circuit signaling interface for transmitting the call origination information and the circuit identification code from the virtual transport server apparatus to the telephonic switching device coupled to the circuit network in response to the processor processing the circuit identification code received by the packet receiver from the packet circuit gateway;

a redundant signaling link coupled to the circuit signaling interface and the telephonic switching device; and a redundant virtual transport server apparatus coupled to the virtual transport server apparatus, wherein the redundant virtual transport server apparatus has an alias point code associated with the virtual transport server apparatus for receiving messages routed to the virtual transport server apparatus when the virtual transport server apparatus is unavailable.

23. The virtual transport server apparatus of claim 22 in which the redundant virtual transport server apparatus and the virtual transport server apparatus divide processing of the call origination information.

24. The virtual transport server apparatus of claim 22 including a redundant packet link coupled to the packet signaling interface and the packet network.

* * * * *